US009783149B2

(12) United States Patent
Taguchi et al.

(10) Patent No.: US 9,783,149 B2
(45) Date of Patent: Oct. 10, 2017

(54) SIDE AIRBAG DEVICE

(71) Applicant: Autoliv Development AB, Vårgårda (SE)

(72) Inventors: Hiroyuki Taguchi, Yokohama (JP); Yutaka Nakajima, Yokohama (JP); Hideho Fukuda, Yokohama (JP); Mitsuo Nogami, Yokohama (JP); Yuto Kobayashi, Yokohama (JP); Makoto Fuma, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/324,566

(22) PCT Filed: May 14, 2015

(86) PCT No.: PCT/JP2015/063923
§ 371 (c)(1),
(2) Date: Jan. 6, 2017

(87) PCT Pub. No.: WO2016/013279
PCT Pub. Date: Jan. 28, 2016

(65) Prior Publication Data
US 2017/0197579 A1    Jul. 13, 2017

(30) Foreign Application Priority Data

Jul. 22, 2014 (JP) ................................. 2014-148459

(51) Int. Cl.
| B60R 21/207 | (2006.01) |
| B60R 21/231 | (2011.01) |
| B60R 21/233 | (2006.01) |

(52) U.S. Cl.
CPC ...... *B60R 21/23138* (2013.01); *B60R 21/207* (2013.01); *B60R 21/233* (2013.01);
(Continued)

(58) Field of Classification Search
CPC combination set(s) only.
See application file for complete search history.

(56) References Cited

U.S. PATENT DOCUMENTS 6,270,113 B1 * 8/2001 Wipasuramonton .. B60R 21/23138
280/728.1
9,296,356 B2 * 3/2016 Fujiwara ............... B60R 21/233
(Continued)

FOREIGN PATENT DOCUMENTS

| JP | 2003-501303 | 1/2003 |
| JP | 2003-335210 | 11/2003 |

(Continued)

OTHER PUBLICATIONS

PCT International Search Report—Apr. 8, 2015.

*Primary Examiner* — Nicole T Verley
(74) *Attorney, Agent, or Firm* — Brinks Gilson & Lione

(57) ABSTRACT

A side airbag device having a plurality of chambers. The side airbag 100 includes: an inflator 110; a rear chamber 114 which deploys at a side part 108 of a seat back 106 and a middle restraining part 122 that protrudes toward the front of a vehicle and a main part 120 at a rear side. A sectioning wall 124 which constitutes a front edge and an upper edge of the rear chamber 114. A front chamber 116 inflates into areas toward the front of the vehicle and the upper part of the vehicle from the sectioning wall 124. An upper opening 126 is formed on the sectioning wall 124 in a rear part of the upper edge of the rear chamber 114. A lower opening 128 is formed on the sectioning wall 124 in a lower part of the front edge of the rear chamber 114.

12 Claims, 7 Drawing Sheets

(52) U.S. Cl.
CPC ............... *B60R 2021/23146* (2013.01); *B60R 2021/23324* (2013.01)

(56) References Cited

U.S. PATENT DOCUMENTS

| | | |
|---|---|---|
| 2003/0168836 A1 | 9/2003 | Sato et al. |
| 2007/0170707 A1 | 7/2007 | Sato et al. |
| 2011/0285119 A1* | 11/2011 | Yamamoto ........ B60R 21/23138 280/743.2 |
| 2016/0101758 A1* | 4/2016 | Fujiwara ........... B60R 21/23138 280/729 |
| 2016/0264091 A1* | 9/2016 | Fujiwara ............. B60R 21/2346 |

FOREIGN PATENT DOCUMENTS

| | | | | |
|---|---|---|---|---|
| JP | EP-3127758 A1 * | 2/2017 | ........... | B60R 21/233 |
| WO | WO 00/46076 | 8/2000 | | |

\* cited by examiner

FIG. 3(a)
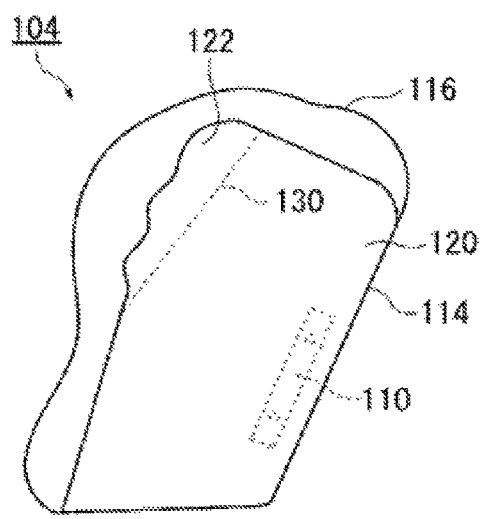
FIG. 3(b)
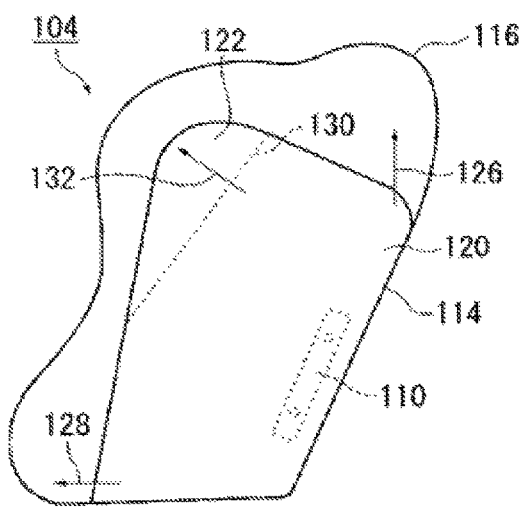
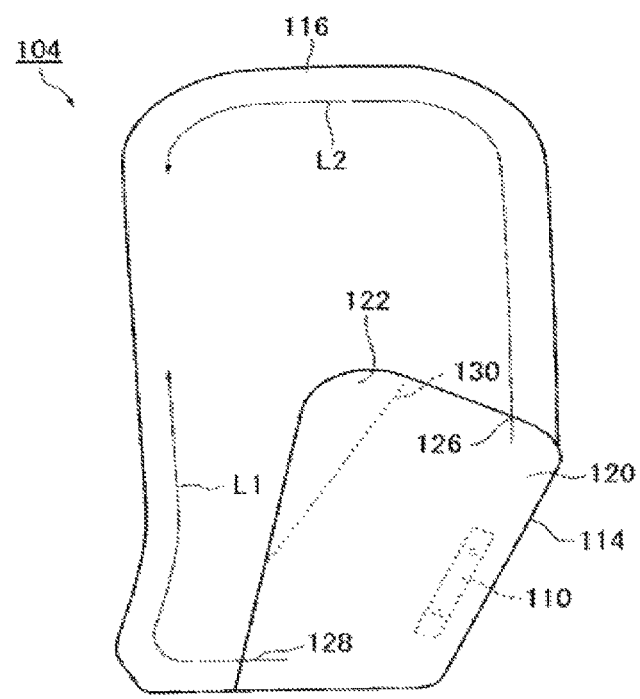
FIG. 3(c)

SECTION A-A

FIG. 7(a)
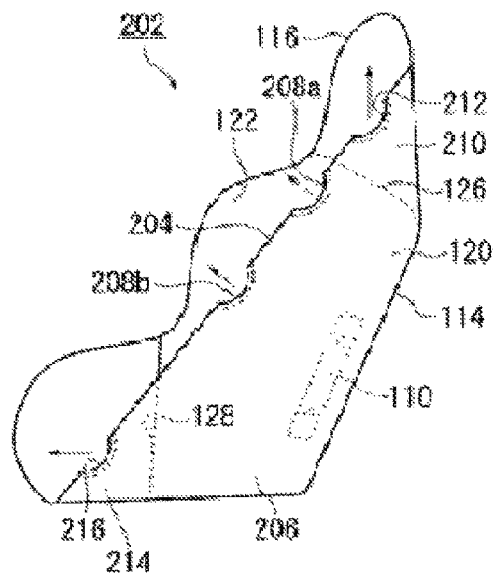
FIG. 7(b)
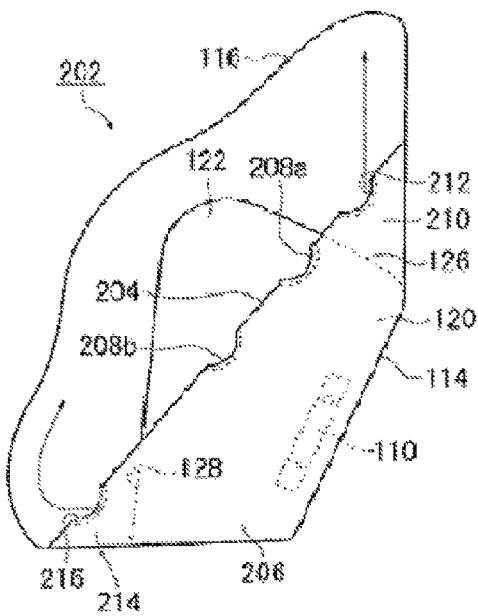
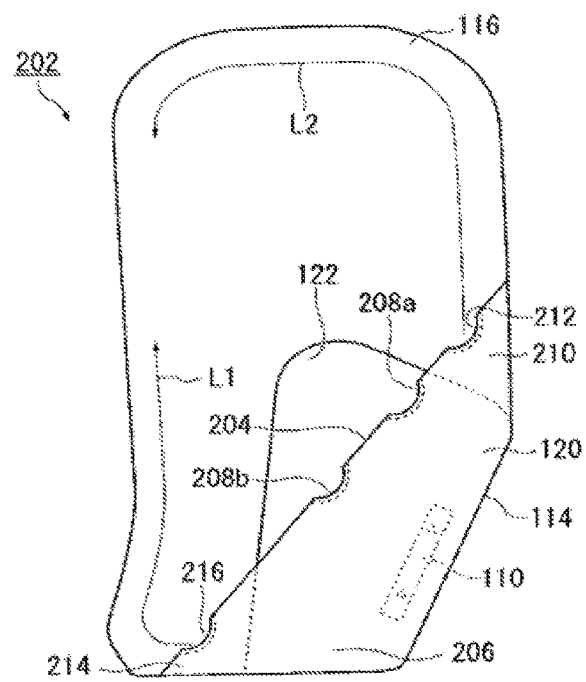
FIG. 7(c)

SIDE AIRBAG DEVICE

CROSS REFERENCE TO RELATED APPLICATIONS

This application claims priority to Japanese Patent Application No. 2014-148459, filed on Jul. 22, 2014 and PCT/JP2015/063923, filed on May 14, 2015.

FIELD OF THE INVENTION

The present invention relates to a side airbag device which restrains an occupant of a vehicle seat from a side impact applied to a vehicle or the like.

BACKGROUND

Airbags have almost become standard equipment in modern motor vehicles. An airbag is a safety device which operates during an emergency such as a vehicle collision and which inflates and deploys under gas pressure to engage with and protect an occupant. Airbags come in various types in accordance with installation locations or applications. For example, a front driver airbag device is provided at a center of a steering wheel in order to protect a driver from a collision in a longitudinal direction (i.e. frontal impact). In addition, in order to protect an occupant from a side collision or from a subsequently occurring rollover (overturn), a curtain airbag device which inflates and deploys along a side window from a vicinity of a ceiling (roof) of a wall part and a side airbag device which inflates and deploys to an immediate side of an occupant from a side part of a seat are provided.

An airbag is provided with a gas generation apparatus called an inflator as a gas supply source. Inflators also come in various types in accordance with types of airbags and installation locations thereof. For example, a disk-type inflator is mainly used for a front driver's side airbag device and the like, while a cylinder-type (cylindrical) inflator is mainly used for a curtain airbag device, a side airbag device, and the like.

For example, Japanese PCT Application No. 2003-501303 describes a side airbag device and a cylinder-type inflator. In the side airbag device, an interior of a cushion is divided into two upper and lower rooms (an upper chamber and a lower chamber) by a panel extending in a vehicle longitudinal direction near a vertical center. The panel is provided with a circulation opening as a hole connecting the two rooms and enables circulation of gas. With the side airbag device according to the above-identified reference, after a tube containing the inflator inflates, gas is first supplied to the lower chamber and subsequently supplied to the upper chamber through the lower chamber.

SUMMARY AND INTRODUCTORY DESCRIPTION OF THE INVENTION

Dividing the interior of an airbag cushion into a plurality of chambers has many advantages. For example, irregular deployment behavior which is apt to occur when gas flows into an entire cushion from the beginning can be regulated and deployment behavior can be stabilized. In addition, by separating a chamber which comes into direct contact with an occupant from a chamber which contains an inflator, pressure of gas injected from the inflator can be prevented from being directly applied to the occupant.

However, although not discussed in above-referenced background document, when supplying gas from the lower chamber to the upper chamber according to the reference, swinging of the upper chamber may occur depending on a direction of the supplied gas. When a deployment behavior of an entire cushion becomes unstable due to swinging of a chamber such as when the cushion assumes an attitude of being inclined toward the rear of the vehicle, an occupant restraining performance declines. Such unstable deployment behavior can result in canceling the advantageous effects produced by the division into a plurality of chambers described earlier.

In consideration of such problems, an object of the present invention is to provide a side airbag device which is capable of further stabilizing a deployment behavior of a cushion having a plurality of chambers.

In order to solve the problems described above, a representative configuration of a side airbag device according to the present invention is a side airbag device which restrains an occupant of a vehicle seat from side impacts, the side airbag device including: an inflator which generates gas; and a cushion which receives the gas and inflates and deploys at the side of a seat back of the vehicle seat during a vehicle emergency, wherein the cushion includes: a rear chamber having a middle restraining part, at least a part of which protrudes from the seat back toward the front of the vehicle to restrain a part of a body of the occupant, and a main part positioned at a rear side of the vehicle than the middle restraining part; a sectioning wall which constitutes a front edge and an upper edge of the rear chamber and which has a prescribed width in a vehicle width direction; a front chamber which inflates and deploys into areas toward the front of the vehicle and the upper part of the vehicle from the sectioning wall; an upper opening which is formed on the sectioning wall in a rear part of the upper edge of the rear chamber and which is capable of supplying gas from the rear chamber to the front chamber; and a lower opening which is formed on the sectioning wall in a lower part of the front edge of the rear chamber and which is capable of supplying gas from the rear chamber to the front chamber.

According to the configuration described above, gas is supplied to the front chamber which inflates later from two locations, namely, the upper opening in an upper-side rear part of the rear chamber which inflates first and the lower opening in a front-side lower part of the rear chamber. In other words, gas flows into the front chamber from two directions; namely, from the rear and from below. According to this configuration, compared to a hypothetical case where gas only flows in from one direction, swinging created by each of the two gas flows can cancel out each other. Therefore, by adopting the configuration described above, the deployment behavior of the front chamber and, by extension, the deployment behavior of the entire cushion can be stabilized. In addition, by suppressing swinging of the cushion, the occupant restraining function by the middle restraining part of the rear chamber described earlier can be exercised more appropriately.

The rear chamber may further include: a partition which divides the main part and the middle restraining part from each other, which is provided so as to be positioned along a vehicle front edge of a side part of the seat back when the cushion inflates and deploys, and which has a prescribed width in the vehicle width direction; and a prescribed partition vent hole which is provided on the partition. Furthermore, completion of inflation and deployment of the middle restraining part of the rear chamber may occur later than completion of inflation and deployment of the main part. According to these configurations, while the rear chamber is a portion which directly receives high pressure of the inflator and inflates instantaneously, such phenomena are limited to the main part. The middle restraining part separated by the partition avoids abrupt pressurization and is capable of suppressing a load applied to the occupant.

In particular, there may be cases where, even if the middle restraining part is set to a pressure which does not create any problems with respect to, for example, restraining a shoulder of an occupant in a proper sitting position, injury values may increase with respect to portions other than the shoulder (for example, when the middle restraining part comes into contact with a chest of an occupant not in a proper sitting position). In consideration thereof, by avoiding abrupt pressurization of the middle restraining part as described above, undesired characteristics with respect to an occupant at positions other than a proper sitting position (a so-called out of position occupant) can be mitigated.

Favorably, the side airbag device further includes: an inner bag which has a bag shape and which receives gas from the inflator prior to the rear chamber, wherein the inner bag includes: a main body part which inflates and deploys inside the rear chamber; an upper protrusion which is continuous to the main body part and which inflates and deploys with protruding into the front chamber through the upper opening; a lower protrusion which is continuous to the main body part and which inflates and deploys with protruding into the front chamber through the lower opening; a central vent hole which is provided on the main body part and which supplies gas to the rear chamber; an upper vent hole which is provided on the upper protrusion and which supplies gas to the front chamber; and a lower vent hole which is provided on the lower protrusion and which supplies gas to the front chamber.

According to the configuration described above, by providing the inner bag inside the rear chamber and distributing gas to respective locations including the rear chamber from the inner bag, inner pressure of respective locations inside the cushion can be readily controlled. In addition, by supplying gas to the front chamber from two directions by the upper vent hole and the lower vent hole of the inner bag, compared to a hypothetical case where gas only flows in from one direction, swinging created by each of the two gas flows can cancel out each other. Therefore, according to the configuration described above, a cushion with a stable deployment behavior can be realized in a preferable manner. Furthermore, by having the inner bag receive high-temperature, high-pressure gas immediately after being injected from the inflator, durability of the rear chamber can be improved by reducing a burden applied to the rear chamber and, in addition, a load which may be applied to an occupant can also be reduced.

The upper protrusion may be joined to the upper opening and the lower protrusion may be joined to the lower opening. According to this configuration, displacement of the upper protrusion and the lower protrusion can be prevented.

The central vent hole may be provided in plurality in a vicinity of the middle restraining part. In addition, completion of inflation and deployment of the middle restraining part of the rear chamber may occur later than completion of inflation and deployment of the main body part of the inner bag. According to these configurations, since inner pressure of the middle restraining part can be controlled while allowing the middle restraining part to inflate and deploy, abrupt pressurization of the middle restraining part can be avoided and a load applied to an occupant can be suppressed.

The upper opening and the lower opening each may include a slit formed on the sectioning wall. According to this configuration, the upper opening and the lower opening can be implemented in a preferable manner as passages of gas from the rear chamber to the front chamber or as locations through which the upper protrusion and the lower protrusion of the inner bag pass.

The middle restraining part may be configured to protrude toward the front of the vehicle from the seat back to at least a position where a shoulder of an occupant at a proper sitting position of the vehicle seat is restrained. The shoulder is a human body part at which loads readily concentrate when the body of the occupant moves in the vehicle width direction and which is a strong part of the body. By restraining the shoulder, the middle restraining part can restrain the occupant more efficiently.

According to the present invention, a side airbag device which is capable of further stabilizing a deployment behavior of a cushion having a plurality of chambers can be provided.

BRIEF DESCRIPTION OF DRAWINGS

FIGS. 3(a), (b) and (c) are diagrams illustrating a process of inflation and deployment of the cushion shown in FIG. 2.

FIGS. 7(a), (b) and (c) are diagrams illustrating a process of inflation and deployment of the cushion shown in FIG. 5.

DETAILED DESCRIPTION

Figure 1A:
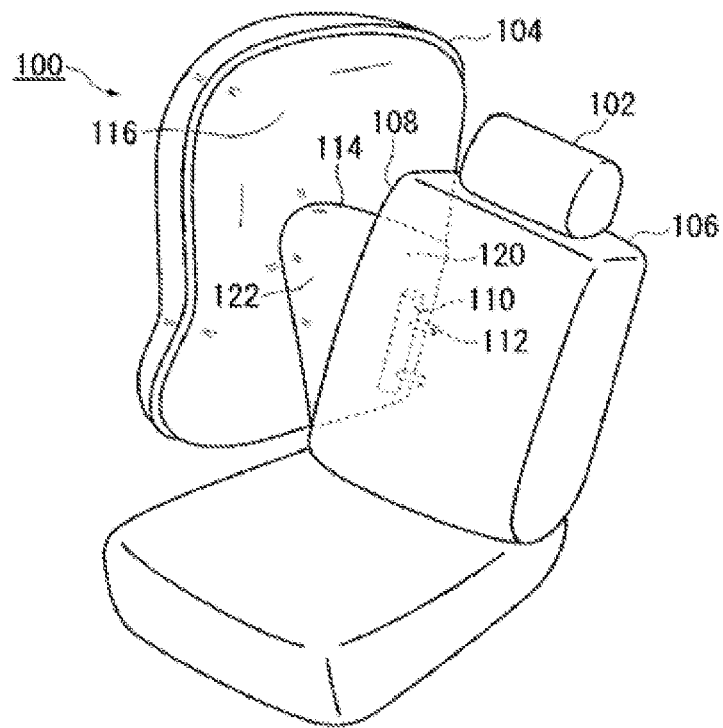
FIGS. 1(a) and (b) are diagrams illustrating a side airbag device according to a first embodiment of the present invention.

Hereinafter, preferred embodiments of the present invention will be described in detail with reference to the accompanying drawings. Dimensions, materials, specific numerical values, and the like described in the embodiments are simply examples provided for facilitating understanding of the invention and are not intended to limit the invention unless otherwise noted. Moreover, for elements having functions or configurations which are substantially the same in the present specification and in the drawings, redundant descriptions will be omitted by denoting such elements with same reference signs. In addition, elements not directly related to the present invention will not be illustrated.

FIGS. 1(a) and (b) are diagrams illustrating a side airbag device according to a first embodiment of the present invention (hereinafter, a side airbag 100). FIG. 1(a) is a perspective view illustrating, from above on an inner side in a vehicle width direction, the side airbag 100 and a seat 102 on a right side of the vehicle to which the side airbag 100 is applied. As illustrated in FIG. 1(a), the side airbag 100 is configured to inflate and deploy at the side of the seat 102.

A cushion 104 is a bag-like portion which restrains an occupant during an emergency such as an impact to the vehicle and which inflates and deploys in a flat shape between the occupant and a side door. The cushion 104 is formed by overlapping a plurality of sheets of a base fabric which constitute a surface of the cushion 104 with each other and sewing or bonding together the plurality of sheets of the base fabric. The cushion 104 is packaged into in a housing (not illustrated) provided in a side part 108 of a seat back 106 in a rolled or folded state. Since the cushion 104 in a housed state is covered by a seat cover or the like, the cushion 104 is not visible from the outside. During operation, the cushion 104 breaches the seat cover or the like and inflates and deploys to the side of the occupant.

An inflator 110 is installed together with the cushion 104 in the side part 108 of the seat back 106. The inflator 110 is a gas generating apparatus and, when an impact occurs, receives an operation signal transmitted from the vehicle and supplies gas to the inside of the cushion 104. The inflator 110 adopted in the present embodiment is a cylinder-type (cylindrical) inflator and is installed contained in the cushion 104. The inflator 110 includes a stud bolt 112 integrated with a surface of the inflator 110. The stud bolt 112 penetrates the cushion 104 from inside thereof and is exposed to the outside, and is fastened to the housing or the like of the side part 108 of the seat back 106.

Currently widely used inflators 110 include those which are filled by a gas generating agent and which burn the gas generating agent to generate gas, those which are filled with compressed gas and which supply gas without generating heat, and hybrid types which use both combustion gas and compressed gas. Any of these types may be used as the inflator 110.

In the present embodiment, an interior of the cushion 104 is divided into two chambers. As is apparent from FIG. 1(a), in the cushion 104, a rear chamber 114 is provided in a lower part of a vehicle rear side as a first chamber and a front chamber 116 is provided on a vehicle front side and a vehicle upper side as a second chamber. The inflator 110 is installed contained in the rear chamber 114.

Figure 1B:
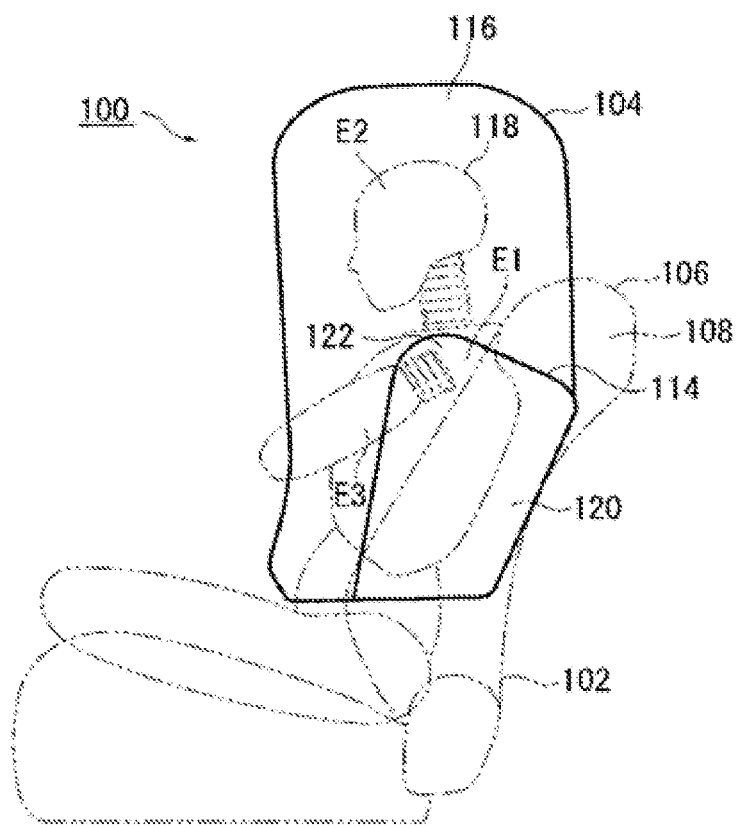

FIG. 1(b) is a diagram of the cushion 104 shown in FIG. 1(a) as viewed from a vehicle inner side in the vehicle width direction. In order to illustrate a positional relationship between the cushion 104 and an occupant, FIG. 1(b) illustrates a test dummy AM 50 simulating a physique (height 175 cm, weight 78 kg) compatible with 50% of average American adult males as an occupant 118 at a proper sitting position.

The rear chamber 114 illustrated in FIG. 1(b) includes two roughly divided portions. A main part 120 is a portion which inflates and deploys in a shape approximately following the side part 108 of the seat back 106. The main part 120 contains the inflator 110 described earlier. A middle restraining part 122 is a portion which restrains a part of an upper body of an occupant and particularly a shoulder E1 of the occupant. The middle restraining part 122 is provided continuous to a front side of an upper part of the main part 120 and inflates and deploys so as to protrude toward the front of the vehicle from the seat back 106 to at least a position where the shoulder E1 of the occupant 118 at the proper sitting position is restrained. The shoulder E1 is a body part at which loads readily concentrate when the body of the occupant 118 moves in the vehicle width direction and which is a strong part of the body. By restraining the shoulder E1, the middle restraining part 122 can restrain the occupant 118 more efficiently.

The front chamber 116 is configured to widely inflate and deploy toward the front of the vehicle and the upper part of the vehicle from the rear chamber 114. The front chamber 116 comes into wide contact with the head E2, an arm E3, and the like and more fully protects the occupant 118.

Figure 2:
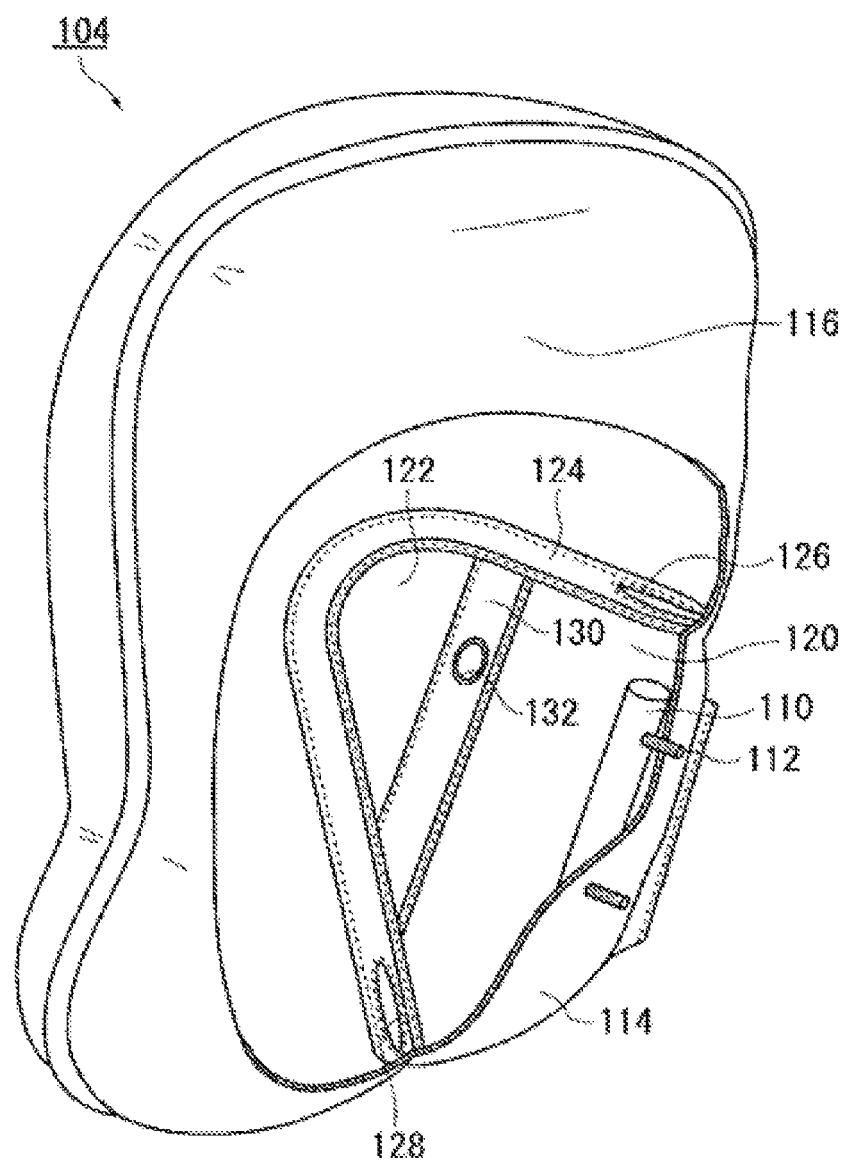
FIG. 2 is a perspective view independently illustrating a cushion shown in FIG. 1(a).

FIG. 2 is a perspective view independently illustrating the cushion 104 shown in FIG. 1(a). In FIG. 2, an internal configuration of the cushion 104 is illustrated by omitting a part of a surface thereof. As illustrated in FIG. 2, a sectioning wall 124 is provided inside the cushion 104. The sectioning wall 124 is a portion which divides the rear chamber 114 and the front chamber 116 and is constituted by an elongated cloth material having a prescribed width in the vehicle width direction. The sectioning wall 124 extends linearly toward the front and the upper part of the vehicle from the seat back 106 (refer to FIG. 1(b)) from below and, after curving along a tip of the middle restraining part 122, inclines linearly toward slightly below the rear of the vehicle. In this manner, the sectioning wall 124 constitutes a front edge and an upper edge of the rear chamber 114.

The sectioning wall 124 is provided with an upper opening 126 and a lower opening 128 as passages capable of supplying gas from the rear chamber 114 to the front chamber 116. The upper opening 126 is formed on the sectioning wall 124 in a rear part of an upper side of the rear chamber 114. Preferably, the upper opening 126 is provided in a vicinity of a rear end of the upper edge of the rear chamber 114. The lower opening 128 is formed on the sectioning wall 124 in a lower part of a front side of the rear chamber 114. Also preferably, the lower opening 128 is provided in a vicinity of a lower end of the front edge of the rear chamber 114. Supply ports of gas from the rear chamber 114 to the front chamber 116 are limited to two locations, namely, the upper opening 126 and the lower opening 128 provided on the sectioning wall 124. By limiting gas supply ports in this manner, the sectioning wall 124 also performs a role of more preferentially inflating and deploying the rear chamber 114 than the front chamber 116.

As described above, in the side airbag 100, the upper opening 126 is provided on the sectioning wall 124 in a rear part of an upper side of the rear chamber 114 and the lower opening 128 is formed on the sectioning wall 124 in a lower part of a front side of the rear chamber 114. Due to this configuration, flows of gas from two directions, below and rear, are created in the front chamber 116. In the present embodiment, the flows of gas from two directions enable swinging movement which may occur of the front chamber during gas inflow to be canceled out.

FIGS. 3(a), (b) and (c) are diagrams illustrating a process of inflation and deployment of the cushion 104 shown in FIG. 2. As illustrated in FIG. 3(a), in the side airbag 100, gas is first preferentially supplied to the rear chamber 114 from the inflator 110. The rear chamber 114 is a portion corresponding to a base of the cushion 104 of the side airbag 100. In the side airbag 100, sequential inflation and deployment are performed in which the rear chamber 114 is promptly pressurized and caused to emerge in a cabin space and, subsequently, the front chamber 116 with a wide shape is pressurized.

As illustrated in FIG. 2, the middle restraining part 122 of the rear chamber 114 is divided from the main part 120 by the partition 130. The partition 130 is a band-like member having a prescribed width in the vehicle width direction and is provided along a vehicle front edge of the side part 108 of the seat back 106 (refer to FIG. 1(b)) in the rear chamber 114. The partition 130 is provided with the partition vent hole 132. The partition vent hole 132 is a supply port which supplies gas from the main part 120 to the middle restraining part 122.

The partition vent hole 132 is limited to a small diameter. More specifically, an opening area of the partition vent hole 132 is set to be smaller than a total opening area of the upper opening 126 and the lower opening 128. This is done in order to cause completion of inflation and deployment of the middle restraining part 122 to be delayed with respect to completion of inflation and deployment of the main part 120. Therefore, in the rear chamber 114, the main part 120 first inflates and deploys as illustrated in FIG. 3(a) and, subsequently, the middle restraining part 122 inflates and deploys later as illustrated in FIG. 3(b). In other words, while the main part 120 instantaneously inflates by directly receiving high pressure of the inflator, the middle restraining part 122 separated by the partition 130 avoids abrupt pressurization. Therefore, a load applied to the occupant by the middle restraining part 122 can be suppressed.

FIG. 3(c) is a diagram illustrating a process of inflation and deployment of the cushion 104 which is a continuation of FIG. 3(b). As illustrated in FIG. 3(c), gas flows into the front chamber 116 from the two directions of from the rear and from below due to the upper opening 126 and the lower opening 128 on the sectioning wall 124. According to this configuration, compared to a hypothetical case where gas only flows in from one direction, swinging movement created by each of the two gas flows depicted by the arrows L1 and L2 can cancel out each other.

For example, when gas is supplied to the front chamber 116 solely by the flow from below to above which is depicted by the arrow L1 in FIG. 3(c), a flow is created in which, after reaching a front side of the upper edge of the front chamber 116, gas is directed toward the rear of the vehicle. As a result, there is a risk that the entire cushion 104 may also incline toward the rear of the vehicle (toward a right side in FIG. 3(c)). In addition, when gas is supplied to the front chamber 116 solely by the flow from the rear on an upper side to above which is depicted by the arrow L2, a flow is created in which, after reaching a rear side of the upper edge of the front chamber 116, gas is directed toward the front of the vehicle. As a result, there is a risk that the entire cushion 104 may also incline toward the front of the vehicle (toward a left side in FIG. 3(c)).

However, in the present embodiment, by supplying gas to the front chamber 116 from the two directions depicted by the arrows L1 and L2, gases advancing in the directions of the arrows L1 and L2 oppose each other and are respectively able to cancel out each other's force. Therefore, by adopting the configuration described above, the deployment behavior of the front chamber 116 and, by extension, the deployment behavior of the entire cushion 104 can be further stabilized. In addition, by suppressing swinging of the cushion 104, the occupant restraining function by the middle restraining part 122 of the rear chamber 114 described earlier can be provided more appropriately.

Moreover, the upper opening 126 and the lower opening 128 shown in FIG. 2 can be provided in simple shapes as slits on the sectioning wall 124. Alternatively, the upper opening 126 and the lower opening 128 can be provided as prescribed vent holes. According to these configurations, the upper opening 126 and the lower opening 128 can be implemented in a preferable manner as passages of gas from the rear chamber 114 to the front chamber 116.

Figure 4:
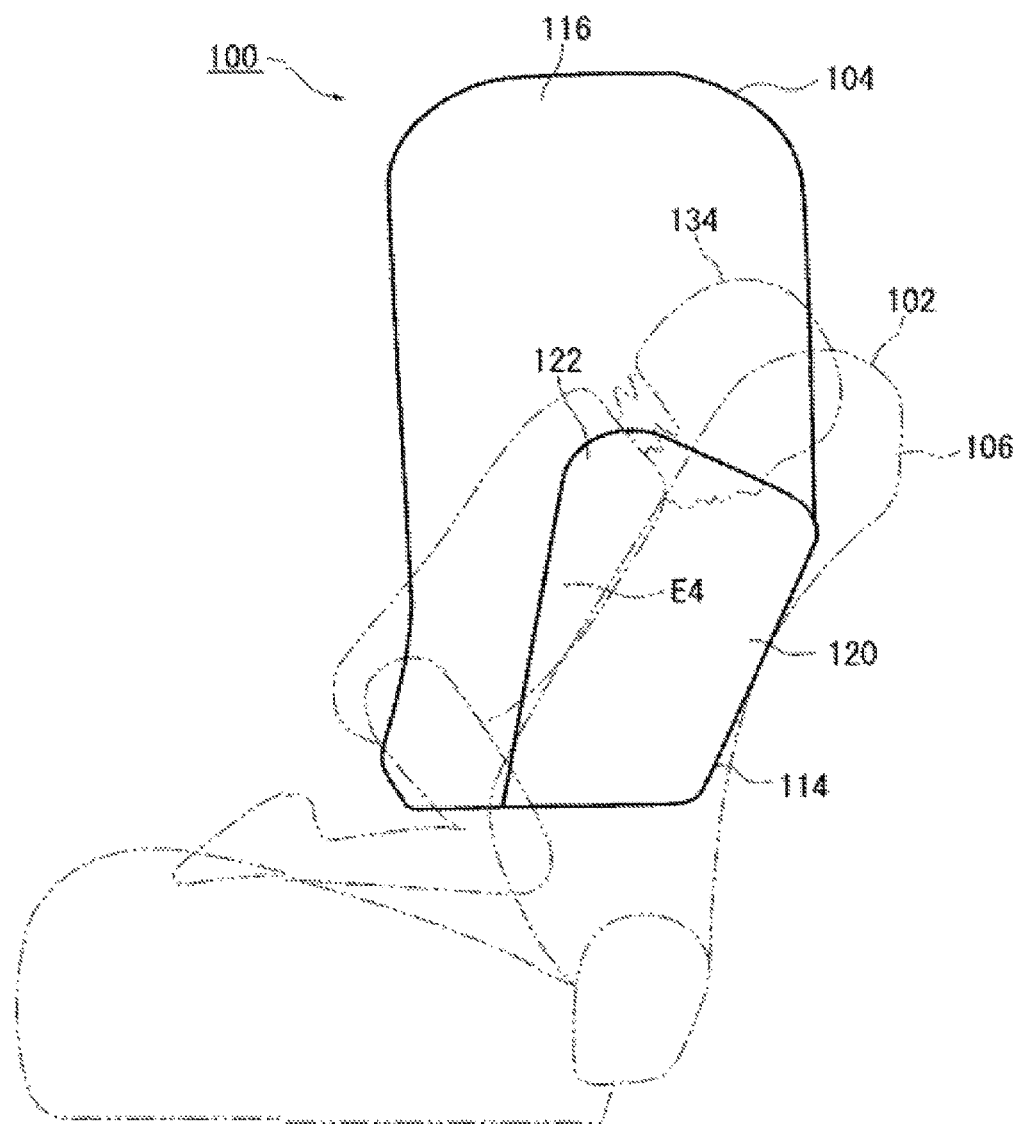
FIG. 4 is a diagram illustrating an infant facing rearward and kneeling on a seat shown in FIG. 1(b).

The configuration of the side airbag 100 described above also takes into consideration occupants not at the proper sitting position (so-called out of position occupants). FIG. 4 is a diagram illustrating an infant dummy 134 facing rearward and kneeling on the seat 102 shown in FIG. 1(b). Although the middle restraining part 122 does not create any problems when restraining the shoulder E1 (refer to FIG. 1(b)) which is a relatively strong part of the body, injury values may increase with respect to portions other than the shoulder E1 such as when the middle restraining part 122 comes into contact with the chest E4 of an occupant not in a proper sitting position. In particular, the infant 134 may sometimes be positioned on the seat 102 in an unforeseen posture. In consideration thereof, as described with reference to FIG. 2, the side airbag 100 avoids abrupt pressurization of the middle restraining part 122 by separating the middle restraining part 122 from the main part 120 with the partition 130 (refer to FIG. 2). According to this configuration, undesired characteristics with respect to an out of position occupant are suppressed.

Figure 5:
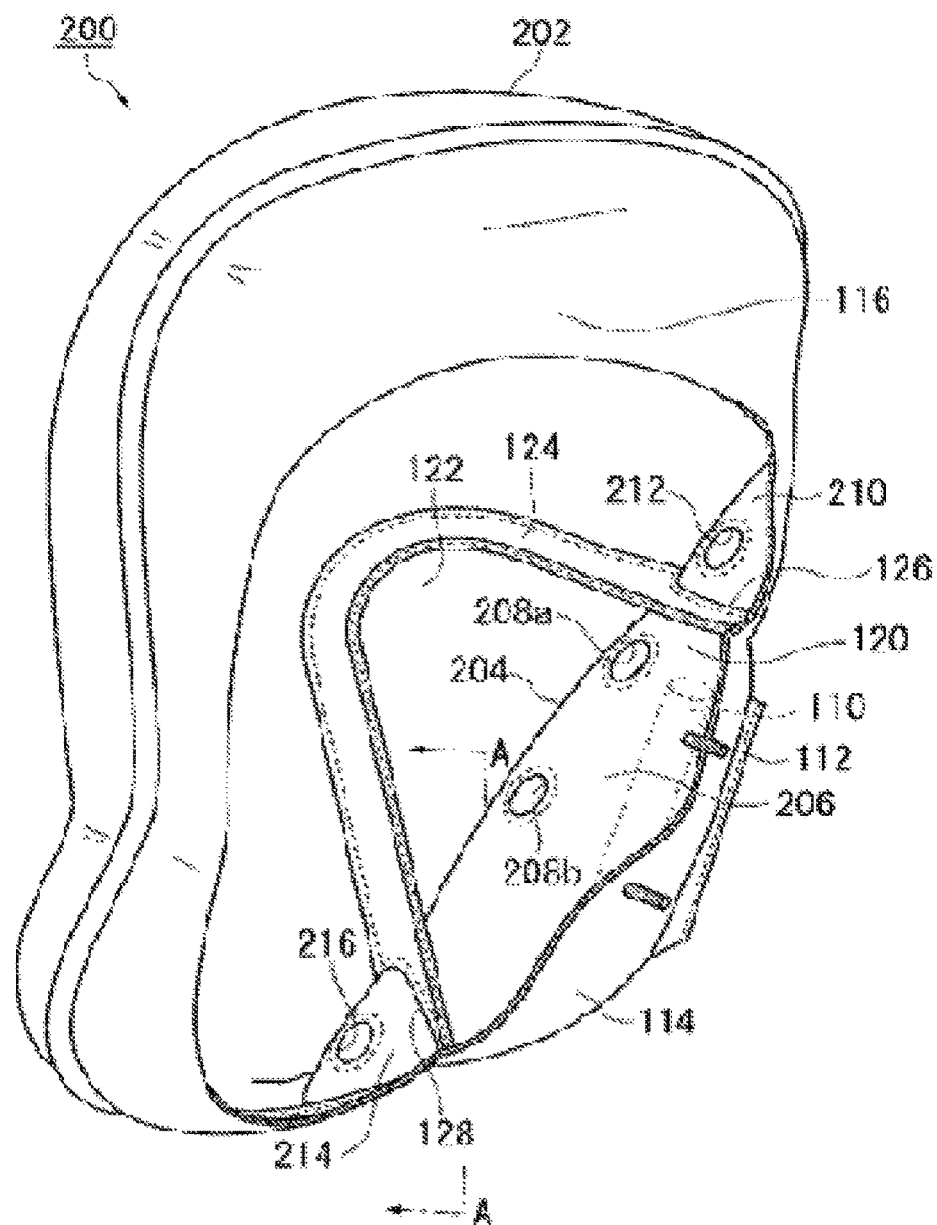
FIG. 5 is a diagram illustrating a side airbag device according to a second embodiment of the present invention.

FIG. 5 is a diagram illustrating a side airbag device according to a second embodiment of the present invention (hereinafter, a side airbag 200). In correspondence with FIG. 2, FIG. 5 illustrates an internal configuration of a cushion 202 by cutting away a part of a surface thereof. The side airbag 200 differs from the side airbag 100 shown in FIG. 2 in that an inner bag 204 is provided inside the rear chamber 114. Moreover, hereinafter, a description of a component similar to those described with reference to FIGS. 1 to 4 will be omitted by denoting the component using a similar reference sign.

The inner bag 204 is a bag-like portion arranged inside the rear chamber 114 and is structured such that upper and lower ends thereof penetrate into the front chamber 116. The inflator 110 is contained in the inner bag 204. Therefore, the inner bag 204 is configured to receive gas from the inflator 110 prior to the rear chamber 114. In the present embodiment, by receiving gas by the inner bag 204 and distributing gas from the inner bag 204 to respective locations including the rear chamber 114, inner pressure of respective locations inside the cushion 202 can be readily controlled. In addition, by having the inner bag 204 receive high-temperature, high-pressure gas immediately after being injected from the inflator 110, durability of the rear chamber 114 can be improved by reducing a burden applied to the rear chamber 114 and, in addition, a load which may be applied to an occupant can also be reduced.

A main body part 206 of the inner bag 204 is a portion which inflates and deploys inside the rear chamber 114. The main body part 206 has enough capacity to occupy a large proportion of the main part 120 of the rear chamber 114. The main body part 206 contains the inflator 110 and instantaneously inflates as the inflator 110 operates. A plurality of (in the present embodiment, two) central vent holes 208a and 208b are provided on the main body part 206. Gas from the inflator 110 is supplied to an internal space of the rear chamber 114 through the central vent holes 208a and 208b. The central vent holes 208a and 208b are provided in plurality in a vicinity of the middle restraining part 122.

An upper part that is continuous from the main body part 206 of the inner bag 204 constitutes an upper protrusion 210 which protrudes into the front chamber 116 through the upper opening 126 and inflates and deploys inside the front chamber 116. The upper protrusion 210 is provided with an upper vent hole 212, and gas is supplied from the inner bag 204 to the front chamber 116 through the upper vent hole 212.

A lower part that is continuous from the main body part 206 of the inner bag 204 constitutes a lower protrusion 214 which protrudes into the front chamber 116 through the lower opening 128 and inflates and deploys inside the front chamber 116. The lower protrusion 214 is provided with a lower vent hole 216, and gas is supplied from the inner bag 204 to the front chamber 116 through the lower vent hole 216.

Diameters of the central vent holes 208a and 208b, the upper vent hole 212, and the lower vent hole 216 provided on the inner bag 204 can be changed as appropriate. For example, the upper-side central vent hole 208a can be set to a larger diameter than the lower-side central vent hole 208b. In this manner, with the cushion 202 including the inner bag 204, inner pressure can be more readily set or changed than the cushion 104 according to the first embodiment. In addition, while a total of four vent holes are provided on the inner bag 204 in the present embodiment, a larger number of vent holes and ventilation parts can also be provided.

Figure 6A:
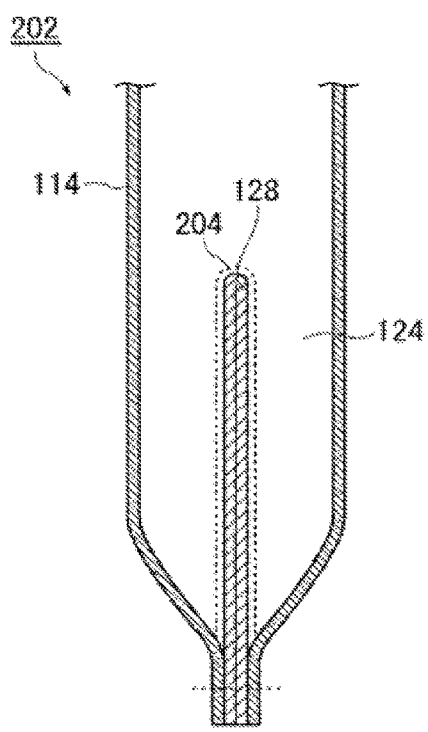
FIGS. 6(a) and (b) are diagrams corresponding to an A-A section of a cushion shown in FIG. 5.

Since the upper protrusion 210 and the lower protrusion 214 have almost the same configuration, the configuration will now be described with reference to the lower protrusion 214 as a representative. FIGS. 6(a) and (b) are diagrams corresponding to section A-A of the cushion 202 shown in FIG. 5. FIG. 6(a) illustrates the lower opening 128 prior to inflation and deployment of the inner bag 204. As illustrated in FIG. 6(a), in the present embodiment, the lower opening 128 is provided as a slit formed on the sectioning wall 124. The lower protrusion 214 (refer to FIG. 5) is inserted into the lower opening 128 and joined to the lower opening 128 by sewing. Therefore, the lower protrusion 214 does not become displaced with respect to the lower opening 128 during circulation of gas. This configuration is also applied to the upper protrusion 210 and the upper opening 126.

Figure 6B:
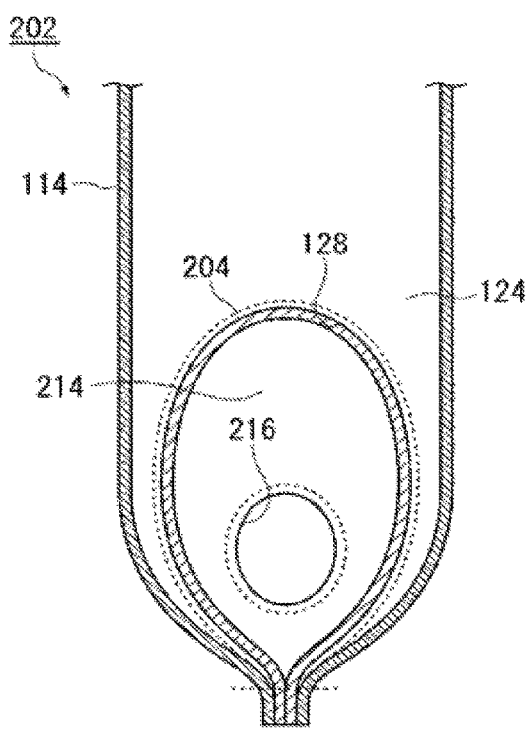

FIG. 6(b) is a diagram illustrating the lower protrusion 214 shown in FIG. 6(a) during circulation of gas. As illustrated in FIG. 6(b), the lower protrusion 214 inflates and causes the lower opening 128 to open during gas inflow. In addition, gas flows into the front chamber 116 (refer to FIG. 5) through the lower vent hole 216 existing ahead (a depth side in FIG. 6(b)) after passing through the lower opening 128.

FIGS. 7(a), (b) and (c) are diagrams illustrating a process of inflation and deployment of the cushion 104 shown in FIG. 5. As illustrated in FIG. 7(a), in the present embodiment, gas is first directly supplied into the inner bag 204 prior to the rear chamber 114 and the inner bag 204 inflates inside the rear chamber 114. In addition, as a result of a seat cover or the like being cleaved by the pressurized inner bag 204, the cushion 202 emerges inside the cabin space.

FIG. 7(b) is a diagram illustrating a process of inflation and deployment of the cushion 202 which is a continuation of FIG. 7(a). The central vent holes 208a and 208b provided on the main body part 206 of the inner bag 204 are provided in plurality in a vicinity of the middle restraining part 122. In addition, the central vent holes 208a and 208b are limited to small diameters. This is done in order to cause completion of inflation and deployment of the middle restraining part 122 to be delayed with respect to completion of inflation and deployment of the main body part of the inner bag 204. According to these configurations, while allowing the middle restraining part 122 to inflate and deploy, abrupt pressurization of the middle restraining part 122 can be avoided and a load applied to the occupant 118 (refer to FIG. 1(b)) can be suppressed. This means that, in a similar manner to the cushion 202 shown in FIG. 4, the cushion 202 is also capable of suppressing undesired characteristics with respect to an out of position occupant (the infant 134).

FIG. 7(c) is a diagram illustrating a process of inflation and deployment of the cushion 202 which is a continuation of FIG. 7(b). As illustrated in FIG. 7(c), gas flows into the front chamber 116 from the two directions of from the rear and from below due to the upper vent hole 212 and the lower vent hole 216. Therefore, compared to a hypothetical case where gas only flows in from one direction, the cushion 202 also enables swinging motion created by each of the two gas flows depicted by the arrows L1 and L2 to cancel out each other. As a result, even with the present embodiment, the deployment behavior of the front chamber 116 and, by extension, the deployment behavior of the entire cushion 202 can be stabilized. In addition, by suppressing swinging of the cushion 202, the occupant restraining function by the middle restraining part 122 of the rear chamber 114 can be exercised more appropriately.

While the above description constitutes the preferred embodiment of the present invention, it will be appreciated that the invention is susceptible to modification, variation and change without departing from the proper scope and fair meaning of the accompanying claims.

The invention claimed is:

1. A side airbag device for restraining an occupant of a vehicle seat from side impacts,
comprising:
an inflator which generates gas; and
a cushion which receives the gas and inflates and deploys at a side of a seat back of the vehicle seat during a vehicle impact, wherein
the cushion includes:
a rear chamber having a middle restraining part, with at least a portion which protrudes from the seat back toward the front of the vehicle to restrain a part of a body of the occupant, and a main part positioned at a rear side of the vehicle with respect to the middle restraining part;
a sectioning wall which constitutes a front edge and an upper edge of the rear chamber and which has a prescribed width in a vehicle width direction;
a front chamber which inflates and deploys toward the front of the vehicle and the upper part of the vehicle from the sectioning wall;
an upper opening which is formed on the sectioning wall in a rear part of the upper edge of the rear chamber configured for supplying gas from the rear chamber to the front chamber; and
a lower opening which is formed on the sectioning wall in a lower part of the front edge of the rear chamber configured for supplying gas from the rear chamber to the front chamber.

2. The side airbag device according to claim 1, further comprising wherein
the rear chamber further includes:
a partition which divides the main part and the middle restraining part from each other, which is provided so as to be positioned along a vehicle front edge of a side part of the seat back when the cushion inflates and deploys, and which has a prescribed width in the vehicle width direction; and
a vent hole on the partition.

3. The side airbag device according to claim 2, further comprising wherein the gas is supplied to the main part of the rear chamber and flows through the vent hole to inflate the middle part of the rear chamber such that completion of inflation and deployment of the middle restraining part of the rear chamber occurs later than completion of inflation and deployment of the main part.

4. The side airbag device according to claim 1, further comprising:
an inner bag which has a bag shape and which receives gas from the inflator prior to the rear chamber, wherein
the inner bag includes:
a main body part which inflates and deploys inside the rear chamber;
an upper protrusion which is continuous to the main body part which protrudes into the front chamber through the upper opening;

a lower protrusion which is continuous to the main body part which protrudes into the front chamber through the lower opening;

a central vent hole which is provided on the main body part and which supplies gas to the rear chamber;

an upper vent hole which is provided on the upper protrusion and which supplies gas to the front chamber; and a lower vent hole which is provided on the lower protrusion and which supplies gas to the front chamber.

5. The side airbag device according to claim 4, further comprising wherein the upper protrusion is joined to the upper opening, and the lower protrusion is joined to the lower opening.

6. The side airbag device according to claim 4 further comprising, wherein a plurality of the central vent hole is provided in a vicinity of the middle restraining part.

7. The side airbag device according to claim 4 further comprising wherein completion of inflation and deployment of the middle restraining part of the rear chamber occurs later than completion of inflation and deployment of the main body part of the inner bag.

8. The side airbag device according to claim 4 further comprising wherein the inflator is placed in an supplies the gas to the inner bag main body part.

9. The side airbag device according to claim 1 further comprising wherein the upper opening and the lower opening each include a slit formed on the sectioning wall.

10. The side airbag device according to claim 9 further comprising wherein the upper opening causes the gas to flow in a generally upward direction through the upper opening and the lower opening causes the gas to flow in a generally downward direction through the lower opening.

11. The side airbag device according to claim further comprising 1 wherein the middle restraining part protrudes toward the front of the vehicle from the seat back to at least a position where a shoulder of the occupant at a proper sitting position of the vehicle seat is restrained.

12. The side airbag device according to claim 1 further comprising wherein the inflator is placed in an supplies gas to the rear chamber main part.

* * * * *